United States Patent [19]

McDevitt

[11] 3,936,265
[45] Feb. 3, 1976

[54] MANUFACTURING CLEAR PLASTIC LIDS
[75] Inventor: James A. McDevitt, Kalamazoo, Mich.
[73] Assignee: Continental Can Company, Inc., New York, N.Y.
[22] Filed: Aug. 15, 1974
[21] Appl. No.: 497,586

[52] U.S. Cl. .................... 425/326 R; 425/72 R
[51] Int. Cl.² .. B29D 7/14; B29D 7/26; B29D 23/04
[58] Field of Search ............ 425/324 R, 325, 326 R, 425/328, 376, 380, 71, 72, 363, 367

[56] References Cited
UNITED STATES PATENTS

| | | |
|---|---|---|
| 3,002,430 | 10/1961 | Voigt et al. .................... 425/326 X |
| 3,008,186 | 11/1961 | Voigt .................... 425/326 R |
| 3,176,347 | 4/1965 | Shaul .................... 425/326 R X |
| 3,320,340 | 5/1967 | Luca .................... 425/326 R X |
| 3,576,051 | 4/1971 | Click et al. .................... 425/326 R X |

Primary Examiner—J. Howard Flint, Jr.
Attorney, Agent, or Firm—H. Lawrence Smith; Joseph E. Kerwin; William A. Dittmann

[57] ABSTRACT

Continuous thermoplastic sheeting is manufactured by extruding thermoplastic material from a circular die to form seamless thin walled tubing. This hot, seamless tube is pressed together between a water cooled draw roll and a water cooled elastomerically coated roll to form sheet material which is transparent and without the speckled finish caused by included air.

4 Claims, 3 Drawing Figures

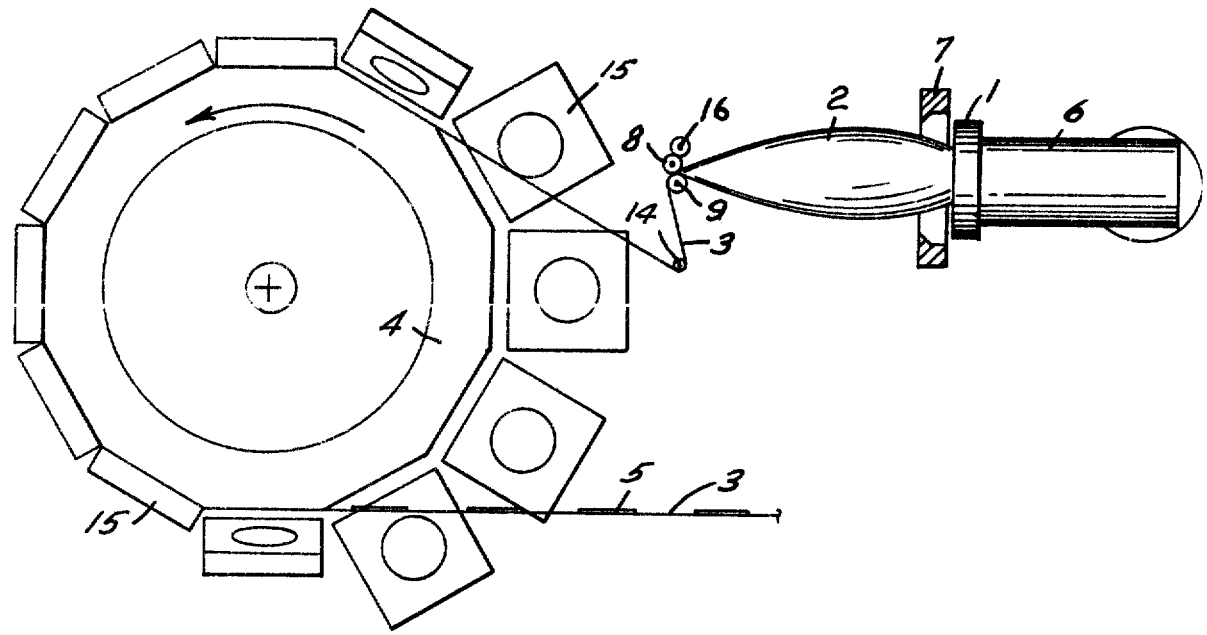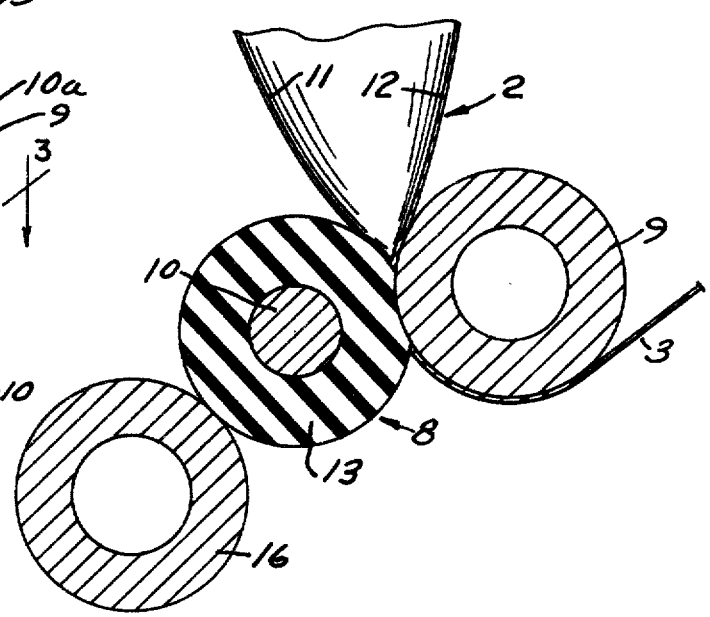

3,936,265

MANUFACTURING CLEAR PLASTIC LIDS

This invention relates to the manufacture of thermoplastic sheeting and more particularly to an apparatus for producing clear fully transparent continuous thermoplastic sheeting from molten thermoplastic material.

In an older method of manufacturing thermoplastic sheeting material a molten thermoplastic material is extruded through a circular die to form a seamless variable size hot tubing. As the tubing moves away from the extruder it may be cooled by air or other gaseous medium which impinges against the outer surface of the tubing wall. The tubing is inflated by air inside the tube and is pressed into a flattened condition to form a broad, thin portion when it is drawn between nip rolls. After it has been formed into a broad, thin portion, it is passed further to the next operation which may be that of cutting its edges and pulling apart the two sheets of material.

Sheeting may be formed by extruding a molten thermoplastic material through a circular die to form a seamless hot tubing.

This tubing is then passed through water cooled draw rolls. The draw rolls press the sides of the tube together to form a sheet of thermoplastic material which has a speckled finish. This speckled appearance is caused by air which is entrained between the flattened tube surfaces. Parts of the tube surfaces in this situation adhere one to the other and other parts have air in between them.

It is the object of this invention to eliminate the formation of air entrainment between the flattened tube surfaces of plastic sheet material.

It is another object of this invention to produce plastic articles of clear transparent sheets.

In the preferred embodiment of the present invention the advantages of this invention, including the simplicity and economy of it, will further become apparent hereinafter and in the drawings in which:

FIG. 1 is a schematic diagram showing the apparatus for making clear plastic sheet and making plastic lids for containers in a continuous rotary fashion.

FIG. 2 shows an enlarged view of the rolls being the pressure roll and a draw roll.

FIG. 3 shows a cross-section of the rolls, the tubular extrudate and sheet taken along 3—3 of FIG. 2.

The embodiment shown in FIG. 1 has a circular die 1 through which a molten thermoplastic material is extruded. The extrudate forms an unseamed tube 2 having a varying diameter along its length. The tube 2 is flattened and pressed to give a clear transparent film 3. The film 3 is processed through a rotary molding wheel 4 to form lids 5 of clear transparent thermoplastic.

In this apparatus thermoplastic material is heated in the extruder chamber 6 until it is molten. The molten material is extruded through the tubular die 1 located at one end of the extruder chamber 6. An air ring 7 or several air rings are mounted about the circular extrudate 2. Cooling air is blown from the air ring 7 inwardly toward the tubular extrudate 2 and impinges on the outside of the tubular extrudate 2 to have a cooling effect. An air jet is located in the interior part of the circular die. As the tubular extrudate 2 proceeds along, air is blown inside the extrudate. The interior pressure causes the diameter of the tubular extrudate 2 to enlarge as it proceeds away from the circular die 1. Located a little distance from the tubular die 1 are a pair of rotatable rolls 8,9 mounted on drive shafts 10,10a. The drive shafts 10,10a (FIG. 2) are driven by suitable motor means (not shown). These paired rolls 8,9 are, however, different from one another. One roll 9 is a water cooled draw roll. The other roll 8 is a pressure roll. The exterior of the pressure roll 8 (FIG. 3) is Teflon coated or coated with a silicone rubber or some other elastomeric material. The purpose of this coated pressure roll is to be sure that no air comes past the pressure roll to form speckled spots between the sheets. It is at this point that the walls 11,12 of the inflated tube 2 which is inflated by the air coming from inside the extruder 6 somewhere, are pressed together by the paired rolls 8,9 and collapsed to form a collapsed tube 3. The collapsed tube passes through the paired rolls while the polymeric material is still hot enough to be welded together by the pressure of the rolls.

Critical to this invention is the elastomeric pressure roll 8. Because of the elastomeric material 13 which forms a coating on the outside of this pressure roll 8, the air inside the tubular extrudate 2 is completely excluded from passing downstream and preventing the two layers of the plastic sheet 3 from being welded together.

The walls 11,12 of the tubular seamless extrudate 2 may vary somewhat in thickness. Thus, as was formerly done, when they are pressed together by paired steel rolls the high points of the wall welded together and the low points are left unattached to each other. Speckling of the finished product is caused by the air between the layers. In my invention one of the pressing rolls 8 has an elastomeric surface 13. The elastomeric roll 8 presses the extrudate walls 11,12 together along their full extent and speckling is ended.

As pointed out above, tubular extrudate may vary somewhat in wall thickness. In a situation where steel rolls are used for both paired rolls then the thinner parts of the extrudate have air included between the tubular walls when they are pressed together. This is because there is no way for a steel roll to press down and press itself against the sides of the extrudate wall where the wall is thin compared to the surrounding wall. In this situation the high points weld together but the low points do not weld together and air is included between sections of the sheet. The included air keeps the walls from welding together and imparts a speckled appearance to the finished sheet.

The plastic tube 2 is relatively hot when it arrives at the paired rollers 8,9. Since no air is present between these walls 11,12 as they pass between the rollers 8,9 and the rollers 8,9 are pressed tightly together, the hot walls 11,12 being passed between them are welded together between the two rolls to form sheet 3. The sheet 3 is bent around the draw roll 9. The pressure roll 8 with its coat of elastomeric material 13 presses the inner surfaces of the plastic walls 11,12 together as they pass around the first draw roll 9. After this the sheet 3 passes down to the second water cooled draw roll 14. After passing around the second water cooled draw roll 14 the welded sheet 3 may go on to the next operation.

A machine such as a rotary molding wheel 4 may perform the next operation on the plastic sheet. Shown to the side of the wheel are dies 15 which turn against the wheel to form plastic lids 5 for containers. These dies 15 form the lid 5 in the plastic sheet 3 and, at a later stage, the lid 5 and sheet 3 are separated.

The lids 5 shown here can be made from most any of the usual polymeric materials for making plastics such as polystyrene (crystal) and high or medium polystyrene, as well as polyethylene, ABS, XT, and others. The temperatures involved in the various elements as well as the spacings would be varied to suit the particular material being used.

A cooling arrangement for the draw roll 9 is shown in FIG. 2. This figure shows the rolls 8,9,16 in perspective with the scale enlarged compared with FIG. 1. A cooling current of water passes through the draw roll 9 into a connecting tube 17, through the cooling roll 16 and out of the apparatus. The tubular extrudate 2 passes through the nip 17 (FIG. 3) between the pressure roll 8 and the water cooled draw roll 9 and is bent over draw roll 9.

When the elastomer 13 of the pressure roll 8 presses down into the thinner sections of the plastic sheet it makes sure that these thin sections are pressed together to form a welded section throughout the extent of the sheet. The coat of elastomeric material 13 must be at least as thick as the sheet 3.

To show the action of the pressure roll more clearly FIG. 3 is taken as a cross-section along the line 3—3 of FIG. 2. The draw roll 9 and pressure roll 8 are pressed together with the flattened tubular extrudate between them. A sheet 3 is formed and cools to form a single thickness sheet 3 as the molten material cools and welds together. A cooling roll 16 may be added to press against pressure roll 8 and prevent pressure roll 8 from heating up.

The advantages of this method are that a perfectly clear transparent sheet of thermoplastic is produced without the speckled finish and better forming is possible because the sheet has now become a single sheet of material rather than two sheets of material welded together at various places.

The foregoing is a description of an illustrative embodiment of the invention and it is Applicant's intention in the appended claims to cover all forms which fall within the scope of the invention.

I claim:

1. Apparatus for forming a clear plastic sheet comprising:
   means for forming molten thermoplastic into a continuous seamless tubing,
   means for cooling the seamless tubing after it leaves the forming means,
   a draw roller rotatably mounted with its axis of rotation transverse to the direction of travel of the seamless tubing,
   the draw roller being formed of uncoated metal,
   the draw roller having internal means for cooling the surface thereof, and
   a pressure roller for pressing the seamless tubing against the surface of the draw roller and for pressing the walls of the tubing together along their extent between the draw roller and the pressure roller to fuse the tubing into a continuous weld and thereby provide a single clear sheet of plastic material,
   the pressure roller being provided with an elastomeric coating.

2. Apparatus as defined in claim 1 further comprising:
   a second draw roller rotatably mounted with its axis of rotation parallel to the axis of rotation of the first-mentioned draw roller, the plane of said axes of rotation forming an acute angle with the long axis of the seamless tubing whereby the seamless tubing is wound about the first-mentioned draw roller in area contact therewith to cool the continuous weld.

3. Apparatus as defined in claim 1 further comprising:
   a cooling roller having internal means for cooling the surface thereof and mounted with the surface thereof in rolling contact with the surface of the pressure roller to cool the pressure roller surface.

4. Apparatus as defined in claim 3 wherein the cooling means of the draw roller and the cooling means of the cooling roller each comprise an internal passage for conducting flow of a cooling medium, the internal passage being connected in series.

* * * * *